(12) United States Patent
Kracklauer

(10) Patent No.: US 6,523,503 B1
(45) Date of Patent: Feb. 25, 2003

(54) METHOD FOR PROVIDING AND MAINTAINING CATALYTICALLY ACTIVE SURFACE INTERNAL COMBUSTION ENGINE

(76) Inventor: John J. Kracklauer, 35 College Ct., Longmont, CO (US) 80503

( * ) Notice: Subject to any disclaimer, the term of this patent is extended or adjusted under 35 U.S.C. 154(b) by 0 days.

(21) Appl. No.: 09/622,509
(22) PCT Filed: Feb. 19, 1999
(86) PCT No.: PCT/US99/03637
  § 371 (c)(1),
  (2), (4) Date: Oct. 16, 2000
(87) PCT Pub. No.: WO99/42710
  PCT Pub. Date: Aug. 26, 1999

Related U.S. Application Data
(60) Provisional application No. 60/075,411, filed on Feb. 20, 1998.

(51) Int. Cl.[7] ................................................ F02B 75/12
(52) U.S. Cl. ........................................................ 123/1 A
(58) Field of Search .................................. 123/668, 670, 123/1 A, 198 A; 60/274

(56) References Cited

U.S. PATENT DOCUMENTS

| | | |
|---|---|---|
| 2,867,516 A | 1/1959 | Pedersen |
| 3,341,311 A | 9/1967 | Pedersen |
| 4,389,220 A | 6/1983 | Kracklauer |
| 4,389,983 A * | 6/1983 | Enga et al. .................. 123/670 |
| 4,612,880 A | 9/1986 | Brass et al. |
| 4,819,595 A * | 4/1989 | Pfefferle ...................... 123/670 |
| 4,955,331 A | 9/1990 | Hohr et al. |
| 5,235,936 A | 8/1993 | Kracklauer |
| 5,299,746 A | 4/1994 | Thuenker et al. |
| 5,746,784 A | 5/1998 | Thünker et al. |
| 5,987,882 A * | 11/1999 | Voss et al. ................... 123/670 |

FOREIGN PATENT DOCUMENTS

| | | | |
|---|---|---|---|
| JP | 58-119918 | 7/1983 | |
| JP | 60237117 A * | 11/1985 | .................. 123/60 |

OTHER PUBLICATIONS

Schug, Guttmann, Preuss, & Schädlich, "Effects of Ferrocene as a Gasoline Additive on Exhaust Emissions and Fuel Consumption of Catalyst Equipped Vehicles," SAE Technical Paper Series 900154, 1990.

Gaffney, Sapienza, Butcher, Krishna, Marlow, & O'Hare, "Soot Reduction in Diesel Engines," Combustion Science & Technology, 1980, vol. 24, pp. 89–92.

Siegla & Plee, "Hetrogeneous Catalysis in the Diesel Combustion Chamber," Combustion Science & Technology, 1982, vol. 27, pp 92–102.

Osawa, Kamo, & Valdmanis, "Performance of Thin Thermal Barrier Coating of Small Aluminum Block Diesel Engine," SAE Technical Paper Series 910461, 1991.

* cited by examiner

Primary Examiner—Noah P. Kamen
(74) Attorney, Agent, or Firm—Kyle W. Rost

(57) ABSTRACT

A catalytically active surface is provided on the clean, combustion-exposed parts of an internal combustion engine that is green, has low operating hours, or is of modern, low emission design. A substrate or thermal barrier coat of high surface area and preferably capable of maintaining a surface temperature of at least 450° C. is deposited in the combustion chamber. Zirconia, silica, or lube oil ash are suitable. A catalytically active moiety such as platinum or iron is dispersed in, on, or with the combustion facing surface of the substrate. Nanophase iron from ferrocene or nanophase platinum are suitable. Catalytic action is maintained by continuously providing a low level of catalytic precursor to the engine in the combustion charge.

14 Claims, 1 Drawing Sheet

METHOD FOR PROVIDING AND MAINTAINING CATALYTICALLY ACTIVE SURFACE INTERNAL COMBUSTION ENGINE

This application is the National Stage of PCT/US99/03637 filed on Feb. 19, 1999 and claims the benefit of Provisional application 60/075411 filed on Feb. 20, 1998.

TECHNICAL FIELD

The invention generally relates to internal combustion engines. More specifically, the invention relates to fuels, lubricants and additives. Another aspect of the invention generally relates to combustion and more specifically to processes of combustion operation, especially to feeding a flame modifying additive. Specifically disclosed is a method for providing and maintaining a catalytically active surface on combustion-exposed parts of an internal combustion engine, such as fire deck, valve faces and piston faces, so that combustion efficiency is improved and harmful exhaust emissions are reduced. The invention is particularly applicable to improving combustion in "green" engines, such as engines that are new, recently rebuilt, or that have low operating hours.

BACKGROUND ART

Worldwide emphasis on reducing global warming and reducing pollution mandates improved efficiency in combustion processes, which can be defined as improved fuel efficiency coupled with reduced emission of pollutants such as oxides of nitrogen (NOx). Ferrocene is known to improve combustion efficiency in burners, for example from U.S. Pat. No. 3,341,311. In quantitative terms, it has been reported that ferrocene can produce a 10% improvement in fuel efficiency. However, such results have not been uniformly achieved, especially with modern design, low emission engines, both new and after they have been in service for an extended time. Such modern engines, i.e., newer than 1995, are designed and constructed to consume less lube oil. In addition, they use cleaner fuels, lower in aromatic and sulfur content. All of these factors combine to minimize combustion chamber deposits. While modern engines running on modern fuels emit fewer pollutants than older engines, the technology has compromised the effective use of ferrocene to achieve still greater improvements.

In older literature, ferrocene was tested in diesel engines and showed effectiveness as a fuel additive for conditioning the engines to achieve improved fuel economy and reduced emissions. U.S. Pat. No. 4,389,220 to Kracklauer discloses a two-stage method of conditioning a diesel engine, resulting in reduced pollutant emissions and increased efficiency in fuel combustion. According to this patent, an initial high dosage of ferrocene, such as 20–30 ppm, in the diesel fuel can eliminate carbon deposits from the combustion chambers and deposit a layer of catalytic iron oxide on the combustion surfaces. Thereafter, a lower dosage of ferrocene, such as 10–15 ppm, maintains the catalytic iron oxide coating. It is considered undesirable to maintain the initial high concentration of ferrocene in diesel fuel, as this will lead to detrimental combustion modifications, minimizing or eliminating the beneficial effects of the catalytic iron oxide wall coating.

Older literature also shows that ferrocene can be effective in gasoline engines by improving the octane rating of treated fuel. In this way, ferrocene can reduce certain exhaust emissions and decrease fuel consumption in gasoline powered vehicles. Schug, K. P., Guttann, H. J., Preuss, A. W., and Schadlich, K., *Effects of Ferrocene as a Gasoline Additive on Exhaust Emissions and Fuel Consumption of Catalyst Equipped Vehicles*, SAE Technical Paper Series, 1990, paper number 900154. The method disclosed in this article and in related U.S. Pat. No. 4,955,331 is the simple addition of ferrocene to fuel as a method of achieving improvements in efficiency and emissions. This technology recently was tested with a modern engine using modern fuels. The test vehicle was a 1998 Dodge Intrepid with 29,500 miles on the odometer before testing started. Three fuel fills without ferrocene, corresponding to over 882 miles of operation, yielded a 27.7 mpg average fuel efficiency. Subsequently, four fills with ferrocene treatment, corresponding to 1170 miles, yielded a 26.4 mpg efficiency. These results suggest that simple addition of ferrocene to fuel as taught by Schug et al is not an effective method of improving combustion in such a gasoline fueled modern engine.

Other tests show that ferrocene does not produce combustion improvement in every case, especially when an engine is of modern design. A recent test with a 1998 Detroit Diesel Series 60 engine followed the process of U.S. Pat. No. 4,389,220 after the engine had accumulated 350 hours of break-in operation. Specifically, the engine was operated for 5 hours at a 125 ppmw dose of ferrocene to the fuel, followed by switching to a 25 ppmw dose for emissions testing. The test results showed no change in the fuel efficiency or NOx emissions of the engine. Hence, the simple staged addition of ferrocene to fuel as disclosed in U.S. Pat. No. 4,389,220 was not effective to improve performance of this modern design diesel engine.

Another approach to improved combustion is by the catalytic coating of combustion chambers prior to assembly and operation of the engine. In work described in Gaffney et al. "Soot Reduction in Diesel Engines: A Chemical Approach," a diesel combustion chamber coated with platinum demonstrated a 40% particulate emission reduction. Unfortunately, this combustion catalytic effect was fully lost after 50 hours of normal engine operation.

Siegia and Plee, "Heterogeneous Catalysis in the Diesel Combustion Chamber," attempted to duplicate Gaffney's result with a new engine having a platinum coating. However, no catalytic activity of any kind was found, despite use of the same platinum coating. This series of experiments showed two of four unresolved problems with platinum coatings: 1) the catalytic effects are non durable; and 2) the catalytic effects are not reproducible. The remaining two unresolved problems with platinum are high cost and the toxicity of platinum as an exhaust pollutant, itself.

Other ferrocene related technology is disclosed in U.S. Pat. No. 4,612,880 to Brass et al., which discloses a method of controlling octane requirement increase in internal combustion engines. This method requires introduction of a gasoline soluble iron compound such as dicyclopentadienyl iron (ferrocene) together with a carboxylic acid or ester derivative thereof, into a combustion chamber coated with alumina or zirconia with a carbon gassification catalyst dispersed therein. However, this technology involving base metal surface catalysis is not effective for the process of this invention, as shown in the test reported at Table 1, 5b2 of this document. In addition, the disclosed catalyst compositions are prepared from soap or salt precursors and used in thick coatings, which deteriorate combustion efficiency.

SAE Paper 910461 discloses a thermal barrier coating that produces increased combustion efficiency of 1.7%. An undesirable effect of this thermal burner coating is an increase in NOx output, which is unacceptable in modern engines facing severe emission control constraints.

It would be desirable to provide improved combustion efficiency by a method or coating that can be made effective even when an engine is "green," or has few operating hours, such that the combustion surfaces have not yet developed substantial combustion deposits.

Similarly, it would be desirable to provide the previously known benefits of ferrocene usage in engines of modern design, i.e., post 1995, having low consumption of lube oil and adapted to use modern fuels with lower aromatic and sulfur contents.

Further, it would be desirable to develop a durable or maintainable coating for the combustion chamber that can maintain the combustion facing surfaces at catalytically active temperatures, despite the attachment of the durable insulating coating on the combustion facing surfaces to a coolant-cooled wall surface.

In combination with providing a catalytically active combustion chamber surface for improved combustion efficiency, it would be desirable to provide a device or system to continuously maintain the active nature of the surface.

To achieve the foregoing and other objects and in accordance with the purpose of the present invention, as embodied and broadly described herein, the method of this invention may comprise the following.

DISCLOSURE OF INVENTION

Against the described background, it is therefore a general object of the invention to provide an improved, reliable and durable, catalytically active film on the combustion facing surfaces of a combustion chamber, such as the fire deck, valve faces and piston faces, in order to improve combustion, even when an engine is "green," has few prior operating hours, is of a design allowing reduced consumption of lube oil, or uses cleaner fuels of lower aromatic and sulur content.

A related object is to provide a method of forming or depositing an improved, catalytically active film on the combustion facing surfaces of a combustion chamber, such as the fire deck, valve faces and piston faces, in order to improve combustion.

Another object is to provide a catalytically active surface and method of forming such surface in a combustion chamber that is capable of maintaining a temperature in the catalytically active range despite the connection of the combustion facing surfaces to a coolant cooled wall surface, which may be at temperatures below 320° C.

Still another object is to provide a method to incorporate into or on to a combustion facing surface of a thermally insulating coating a catalytically active metal, which is active in carbon particulate and fuel oxidation at catalytically active surface temperatures.

An important object is to provide an effective method and system for delivering a maintenance dosage of a catalyst precursor in the combustion charge to each cylinder so that the catalytic activity of an existing catalyst is continuously maintained and refreshed.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the method of this invention, improved combustion is achieved in an internal combustion engine of the type igniting a combustion charge in an area having a combustion facing engine surface. The method provides the initial step of applying to a combustion facing engine surface a substrate layer of high thermal inertia. This initial step is performed in either of two ways: a substrate precursor may be supplied in the combustion charge during engine operation; or a thermal barrier coating may be supplied on the combustion facing engine surface prior to engine assembly. Simultaneously or subsequenty to the initial step, a further step of the method provides a catalyst surface on the substrate layer. This catalyst surface is of the type active in carbon particulate and hydrocarbon oxidation at a surface temperature of at least 450° C. In a next step of the method, during operation of the internal combustion engine and subsequent to the step of providing the catalyst surface, a maintenance dosage of a catalyst precursor is provided in the combustion charge to the catalyst surface on a substantially continuous basis during stable engine operation. Thus, catalytic activity is substantially continuously maintained.

In the method, the internal combustion engine may be either a compression ignition engine or a spark ignition engine. The substrate layer is of a material having a surface area of 300 to 500 meters per gram as measured by BET nitrogen absorption. It may be of 100 to 100,000 angstroms thickness and is preferred to be a film of less than 0.1 mm thickness. The preferred substrate layer is selected from zirconia, silica, and lube oil ash.

According to the method, the substrate may be formed of a thermal insulating compound effective in providing a high thermal inertia to the catalytic surface to maintain it in a catalytically active temperature region during stable engine operation. The thermal insulating compound may be of the type effective to maintain the catalyst surface at a temperature of at least 450° C. during stable engine operation.

The method provides that the catalyst surface may be selected from nanophase iron, nanophase platinum, and combinations of the two. The catalyst surface may be created during operation of the engine by supplying a combustion charge containing ferrocene in an effective dosage to establish a catalytic iron coating. This combustion charge may contain ferrocene in a dosage range from 25 to 120 ppmw of engine fuel. The step of providing the catalyst surface may be performed simultaneously with the step of providing the substrate layer. The catalyst precursor preferably is supplied in a dosage from 5 to 50 ppmw of engine fuel. The catalyst precursor may be ferrocene. The ferrocene may be provided to the combustion chamber by adding it to the fuel or to lube oil, or by vaporization into the intake air to the engine.

The accompanying drawings, which are incorporated in and form a part of the specification illustrate preferred embodiments of the present invention, and together with the description, serve to explain the principles of the invention. In the drawings:

BEST MODE FOR CARRYING OUT THE INVENTION

Figure 1:
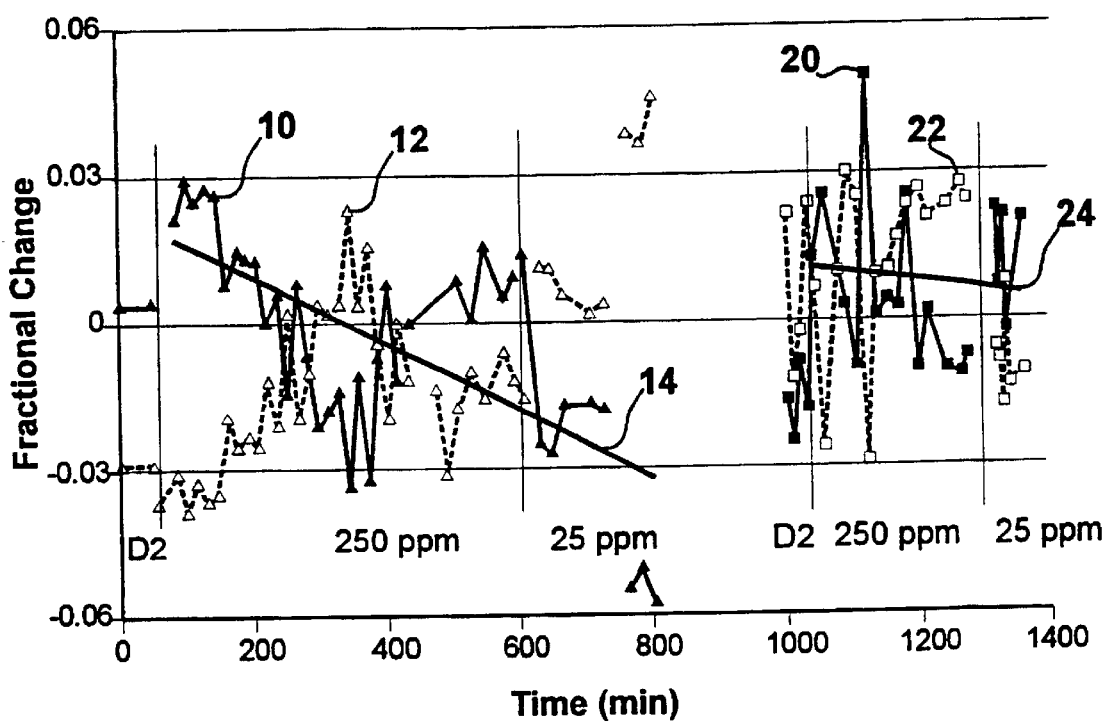
FIG. 1 is a data graph of variation of IMEP and ISFC with time shown as fractional changes from mean value of the variable, which shows an improving trend in fuel consumption with the process of this invention. Results are shown in the left hand plot for an aluminum piston and in the right hand plot for a thermal barrier coated piston.

The process of this invention consists of a combination of three elements that provide and maintain a catalytically active surface on the combustion-exposed parts of an internal combustion engine:

1.) A durable, thermally insulating coating of combustion chamber parts is required to raise the combustion facing film surface temperature to a catalytically active region above 450° C. This can be accomplished either with a thin ($\leq 0.1$ mm) zirconia coating or a silica aerogel coating. Pre-applied ceramic or thermal barrier coatings are effective, and can maintain the temperature in the required range during stable operation of the engine, such as when the engine is warmed-up and is operating at near temperature equilibrium.

In the alternative, a suitable coating can be established by lube oil ash or the addition of combustible, ash forming materials to the fuel, such as tetraethylorthosilicate. Additions to the fuel are delivered into the engine in the combustion charge, which is defined to be fuel or fuel mix delivered into the combustion chamber through valves, fuel injectors, or like engineered delivery systems. Notably, materials entering the combustion chamber via ring blow-by are not considered to be components of the combustion charge. Instead, such blow-by materials are considered to be contaminants. Due to tighter ring tolerances in modern engines, increasingly less ring blow-by occurs. Indeed, such tighter tolerances have necessitated the present invention.

2.) A catalytically active moiety such as, for example, platinum or iron, is dispersed in, or preferably on, the combustion facing surface of the insulating coating, or is supplied simultaneously with the coating. Nanophase iron from ferrocene or nanophase platinum can be applied either simultaneously with the coating or subsequently. An effective engine conditioning dose of ferrocene should range from 5 ppm to 500 ppm by weight based on fuel.

3.) After assembly of the catalytically coated parts into an engine, or in situ establishment of the coating into the engine, it is necessary to continuously provide a low level of catalytic precursor to the engine so that the catalytic activity can be maintained. One example of a suitable precursor is 25 ppm by weight of ferrocene in fuel. An effective range of ferrocene maintenance dose is 5 to 60 ppmw. Application can be accomplished by a variety of techniques, such as those disclosed in U.S. Pat. No. 5,235,936 or 5,113,804, incorporated by reference herein for such teachings. It is suitable to deliver the ferrocene in the engine's air intake stream by sublimation or evaporation. In addition, the ferrocene or other catalytic metal can be applied by continuous liquid fuel treatment.

Ferrocene is a useful additive to improve combustion efficiency in internal combustion engines, whether of the spark ignition type, i.e, a gasoline engine, or the compression ignition type, i.e, a diesel engine. It has been observed that a relatively long period of time is required to develop improved performance. In highway testing, both gasoline and diesel engine equipped vehicles have been found to require consumption of large volumes of ferrocene treated fuel. In light duty engines, about 120 gallons of treated fuel is required, treated with ferrocene at 25 ppm, to achieve a 10% increase in fuel economy. In heavy duty engines in efficient service, as much as 6000 gallons of treated fuel is required.

A research program with a small gasoline engine confirmed such on-highway results. In addition, it showed that increasing ferrocene dose by as much as 5 times, to 125 ppm, results in a substantial 5 fold reduction in the amount of fuel required to provide full combustion efficiency improvement. Nevertheless, at this treatment rate of 125 ppm, 24 gallons consumption still is required, requiring at least 10 hours of operating time. This same test showed that a 20 fold increase in ferrocene dose to 500 ppm reduced the fuel economy benefit by 75% from the standard dose case. Thus, immediate, substantial and reliable engine performance enhancement, required for emission certification and commercialization, is not possible with this technique.

A small, 24 cc, two stroke gasoline powered water pump was used to demonstrate the performance two stage ferrocene treatment. Repeated tests with this engine in a water recirculation set-up producing a constant 6 gpm water flow have shown it is capable of repeatable operation. Of equal importance, disassembly, cleaning of the piston face to a clean and polished condition, reassembly and rerunning the engine does not change the fuel consumption rate in the unmodified or baseline state. Fuel consumption is equated to engine efficiency and is the only dependent performance variable which is measured in this test.

This engine was used to demonstrate that ferrocene fuel treatment with engine conditioning provided an 11.3% reduction in fuel consumption, which was durable for 60 minutes of additional operation using 25 ppm ferrocene in the fuel. The engine was operated for 60 minutes at a 10 fold increased ferrocene dose, i.e., 250 ppm relative to fuel weight for 60 minutes, then subsequently at 25 ppm to maintain the coating.

A subsequent test run under identical conditions and control with equivalent iron levels in the fuel, i.e., 75 ppm iron for 60 minutes followed by continuing operation at 7.5 ppm iron in fuel. This test used an iron soap, which is not a catalyst precursor for this internal combustion engine application. In the first test immediately after 60 minutes high dose operation, the use of iron soap caused an initial 7.8% increase in fuel consumption rate. This is to be expected because a high surface area, non-catalytic surface coating will increase the normal combustion termination reaction at the combustion chamber walls reducing efficiency and increasing fuel consumption to maintain the fixed 6 gpm water recirculation rate.

In one reduction to practice of this invention, a piston which had been run in the engine to establish its baseline performance was cleaned down to bare aluminum, that is, new, unused condition, and submitted to a sol gel coating process to generate a platinum containing silica aerogel coating with the following coating specifications:

A.) A high surface area, low density silica aerogel coating—preferred to be a 300 to 500 square meters/ gram surface area as measured by BET nitrogen absorption.

B.) The coating is to contain 10% to 20% by weight of a nanophase dispersion of platinum particles.

C.) The coating should be 500 Å or more in thickness.

When this coated, clean piston was reinstalled in the engine, the immediate performance was at a 5.1% reduced rate of fuel consumption. Notably, only the piston face was coated, while the fire deck was not. The coated area is about 50% of combustion chamber surface area. The result was equivalent to the post-conditioning, fully catalytic performance achieved earlier using ferrocene. This result proves the efficacy and necessity of employing the first and second elements of the invention. According to the invention, the first element provides a high thermal inertia surface coating. The second element provides a catalytic moiety dispersed in the nanophase size range, in or on the surface coating.

The catalytically coated piston was then operated for an additional 60 minutes with no added catalyst precursor in the combustion chamber charge. The catalytically enhanced efficiency was found to have fallen off by 34% in these 60 minutes, confirming the requirement for continuous use a catalyst precursor to maintain durable catalytic activity. In contrast, the previous ferrocene test, in which the ferrocene fuel treatment at 25 ppmw was continued for 60 minutes of post conditioning operation, showed no loss of catalytic combustion enhancement. This contrast proves the necessity of the third element of the novel process of his invention, namely: continuous supply of a catalyst precursor to the engine to maintain the catalytically improved efficiency of combustion.

A catalytic surface treatment inside a combustion engine can be produced by traditional wet chemical processes, or generated in situ by fuel composition modification. The disadvantage of such processes is that they require high temperature and high thermal flux resulting from fully developed combustion processes in the engine in order to achieve their catalytic benefits. By way of example, other known processes for depositing thin metallic films include chemical vapor deposition, flame spray or plasma jet coating. These processes can develop a catalytically active surface that is amorphous, as contrasted to coherent or microscopically uniform coatings applied by traditional coating technology.

A thin film coating is preferred for application of a catalyst to improve combustion. Adequate catalytic activity is achieved or enhanced by a highly irregular surface of at least about 100 angstroms to an approximate maximum of about 500 microns. This type of coating can provide adequate catalytic activity at temperatures below 250° C. The coating can be accomplished by a two step process in which an amorphous surface texturing material, such a silica aerogel, is first deposited, followed by the catalytically active metal coating. The two steps can be combined into a single stage process with mixed substrate/metallic components. This type of coating can be applied to the combustion surfaces of a new internal combustion engine. Thus, an effective substrate/catalyst coating can be created much sooner and with greater reliability than with establishment of a stable combustion pattern, which typically requires 10 to 600 hours of operation.

One example of a suitable substrate is silica of high surface area or roughness. A desirable surface area is 300 to 500 square meters per gram measured by BET nitrogen absorption. A suitable thickness of this coating is in the approximate range from 100 to 250 angstroms. The silica coating may contain a metallic element. Preferred metals are platinum or iron. The desired concentration of the metal is 20% for a 100 angstrom film or 10% for a 250 angstrom film.

EXAMPLE 1

Overview

This example describes an experimental protocol designed to answer whether the ferrocene treatment technology would be effective with small, two cycle gasoline engines where lubricant is added to or with the fuel to maintain above port lubrication.

A program of engine conditioning has been conducted and evaluated for its ability to increase efficiency in internal combustion engines. One aspect is creation of catalytic surface activity. For this purpose, two cycle gasoline engines seemed particularly subject to enhanced performance. Two reasons for this expectation are (1) the shorter duration power stroke available in two cycle combustion, which could benefit from reduction of the combustion retarding effect of the wall quench; and (2) the fuel additives used in the program improve lubrication quality and reduce particulate emissions.

This program used a small 24 cc, 1.3 horsepower water pump. The pump was set up to deliver a fixed 6 GPM flow rate of water and the fuel flow required to maintain that output was measured. It was necessary to adjust discharge pressure to accommodate differences in combustion chamber/piston/ring tolerances as the five rebuilds required during this program were conducted.

The results of the program demonstrated:

Baseline fuel flow stabilized after a 5 hour break in period.

Engine conditioning with ferrocene could be completed in 60 minutes.

The conditioned engine required 30% less fuel to maintain the 6 GPM water flow.

Quadrupling the conditioning dose of ferrocene decreased efficiency improvement by 50%.

Substitution of an alternative iron catalyst for ferrocene yielded no significant change in fuel flow from the untreated baseline fuel consumption.

The ferrocene engine conditioning develops a catalytic coating on the piston face and combustion chamber head. This catalytic iron coating changes the normal combustion quench wall reaction to a combustion promoting or, at least, neutral surface which results in a net increase in combustion efficiency.

Other evaluations of this engine conditioning technology showed effectiveness in both automotive gasoline and diesel engines. The effectiveness (% improvement) seems similar in both types of equipment with engine size, not fuel/combustion type being the primary variable. This similarity of result with both premixed (gasoline) and diffusion (diesel) combustion regimes lends support that the effectiveness is attributable to surface catalytic factors. The benefits of ferrocene observed with gasoline engines are: increased octane; increased MPG—usually about 10%; reduced HC and CO emissions; reduced combustion chamber deposits; and reduced valve wear. The diesel engine benefits are: increased MPG—usually about 5 to 10%; increased engine life—usually 40%; decreased deposits on combustion chamber, piston ring grooves and valves; decreased lube oil consumption; and decreased particulate emission—usually 40%.

Experimental Procedure

An initial investigation was focused on the smallest and presumably least efficient engine and limited to investigation of combustion efficiency as recorded at constant load fuel consumption. A Diawa GP 25 water pump was chosen as the experimental engine. It features a 1.5 cubic inch (24.1 cc) displacement developing 1.3 HP at 7,500 RPM, a 6.3:1 compression ratio with a float type carburetor. The laboratory set-up used a 55 gallon water reservoir, discharge water flow meter, pressure gauge and head adjustment valve with temperature of fuel, recirculating water and intake air as well as engine exhaust being measured. The pump was used to recirculate the water to the reservoir against a constant head (31 to 35 PSI) at a constant flow rate (6 gallons per minute). The fuel flow required to maintain this output was continuously measured with a flow meter. The pump was found to be stable in operation for any given piston/ring/liner-head rebuild but significantly variable between rebuilds.

Two initial baseline runs demonstrated that 5 hours of operation were required to stabilize performance which then remained stable (constant fuel flow at constant water flow and discharge pressure) for up to 11 hours. This experimental apparatus was then used to investigate the effectiveness of ferrocene technology in this small two cycle gasoline engine.

Experimental Plan

Two runs with untreated fuel were conducted to determine the length of time required for this engine and test set-up to stabilize fuel consumption The first ferrocene test was conducted using a five fold increase in dose of the catalyst to accelerate engine conditioning. This five fold dose was run for 60 minutes followed by triplicate tests conducted at the end of this test run. The fourth run evaluated a 20 times dose rate used for only 5 minutes to determine if further acceleration of engine conditioning was possible. The fifth test looked at two different effects. First, multiple disassembly/re-assemblies of the same combustion chamber, piston and rings was conducted to determine the ability to reproduce fuel consumption results after disassembly. Finally, a different iron catalyst was used to determine if the catalytic effectiveness of ferrocene could be duplicated. The experimental results are shown in Table 1:

TABLE 1

Test Results

| Run No. | 1 | 2 | 3 | 4 | 5a | 5b |
|---|---|---|---|---|---|---|
| Ambient Temperature (° C.) | 58 | 46 | 60 | 62 | 48/65 | 66 |
| Water Temperature (° C.) | 68 | 75 | 85/67 | 88 | 81/69 | 73/79 |
| Exhaust Temperature | 684 | 751 | 613 | 584/903 | 992 | 911 |
| Water Flow GPM | 6 | 6 | 6 | 6 | 6 | 6 |
| Water Pressure[1] | 35 | 35 | 31 | 33 | 35 | 34.5 |
| Fuel Flow Average | 5.29 | 5.01 | 7.96 | 7.15 | 5.53[2] | 5.91[2] |
| Standard Deviation | .19 | .53 | .07 | .25 | .18 | .28 |
| Treated Fuel Flow Average | | | 5.27 | 6.15 | 5.72[2] | 6.04[3] |
| Standard Deviation | | | .09 | .25 | .13 | .23 |

Table 1 Notes:
[1]Adjusted to achieve 6 GPM flow rate.
[2]Three serial rebuilds using same parts, designated 5a1 = 5.53; 52a = 5.72; 5b1 = 5.91.
[3]Test Result with iron soap addition is 5b2 = 6.04.

Conclusions

1) A five hour break-in is required to stabilize fuel consumption.

2) This small engine is very sensitive to combustion chamber/piston/piston ring match as is indicated by the variability in broken-in fuel consumption across tests 1 through 5.

3) A 60 minute run at a 5×dose of ferrocene (Run 3) was sufficient to condition the engine as is indicated by the substantial reduction in fuel consumption after conditioning.

4) There was no time trend to the continued use of Ferrocene treatment for 60 minutes after the conditioning dose was terminated so conditioning was complete in 60 minutes at 5 times dose rate.

5) The 20 times conditioning dose (Run 4) may have been too high since the performance improvement was smaller (14% versus 34% in Run 3 at 5 times) and a second 5 minute run at 20 times dose resulted in a 2 standard deviation increase in fuel consumption.

6) Repeated re-assembly of the same engine parts (rests 5a1 Abaseline, 5a2 reassembly, 5b2 reassembly) did require as much as 60 minutes to reseat but in each case (repeated twice) fuel consumption returned to the baseline value for that set of parts.

7) The alternative iron catalyst (rest 5b2) produced no significant change in fuel consumption, confirming the unique activity of ferrocene in generating this catalytic coating which improved efficiency.

EXAMPLE 2

Overview

This example describes the effectiveness of ferrocene in fuel to develop a catalytic surface in the combustion chamber of a single cylinder diesel engine. The testing involved two phases, each with a different engine configuration. In the first, the engine was evaluated with normal combustion deposits from previous operations, and with an aluminum piston. In the second phase, a new piston was installed, coated with a 500 micron thermal barrier coating of plasma sprayed zirconia (PSZ). The second test used the original cylinder liner, piston rings, and head. However, all combustion deposits were removed and the cleaned parts had no thermal barrier coating.

Test Plan

The initial plan called for the engine to be conditioned by use of fuel with 250 ppm ferrocene, for 240 minutes, followed by operation with 25 ppm fearocene. Because the engine was air cooled, a water spray was directed against the head and cylinder liner to achieve lower block temperatures similar to water cooled engines.

As a preliminary evaluation of the engine, two runs were to be conducted with untreated 2-D diesel Fuel to determine baseline characteristics. The initial high dose ferrocene treatment at 250 ppm was continued until particulate matter fell to a stable level. Then, the ferrocene level was reduced to 25 ppm and the engine was tested for the same baseline characteristics, which include emissions level and heat release rate.

Then, the engine was prepared for the second phase of the test. The original aluminum piston was replaced with the new thermal barrier coated (TBC) piston, and combustion deposits and catalytic coating from initial testing were removed from the fire deck (head and valve faces). The engine was retested, again determining baseline characteristics, conditioned with the high dosage or ferrocene, and tested while running with low dosage of ferrocene.

Testing

The testing with the aluminum piston and established combustion deposits was conducted for 50 minutes to establish baseline. The baseline data is shown in the region labeled D2 on the left hand graph of FIG. 1, from time 0 to time 50 on the time axis. Fuel was switched to 250 ppm ferrocene without stopping the engine and continued for 390 additional minutes. The following day, the engine was started with 250 ppm ferrocene fuel and run for 180 minutes. The high dose data is shown in the region labeled 250 ppm on the left hand graph of FIG. 1, from time 50 to time 620 on the time axis. On a third day, the engine was started with 25 ppm ferrocene fuel and run for 132 minutes. On a fourth day, the engine was started with 25 ppm fuel and run for 85 minutes. This low dose data is shown in the region labeled 25 ppm on the left hand graph FIG. 1 from time 620 to time 817 on the time axis. The disconnected final three data points on the graph, approximately at time 800 minutes, are believed to reflect a malfunction in one of the instruments.

In the second phase testing with the TBC piston and cleaned fire deck, the engine was run for 60 minutes to establish baseline. This baseline data is shown in the region labeled D2 on the right hand graph of FIG. 1, from time 1000 to time 1060 on the time axis. Fuel was switched to 250 ppm ferrocene without stopping the engine and continued for 250 additional minutes. The high dose data is shown in the region labeled 250 ppm on the right hand graph of FIG. 1, from time 1060 to time 1310 on the time axis. The following day, the engine was started with 25 ppm ferrocene fuel and run for 75 minutes. The data from this low dose test is shown in the region labeled 25 ppm on the right hand graph of FIG. 1, from time 1310 to time 1385 on the time axis.

Experimental Results

Data recorded during the test included exhaust gas emissions, particulate emissions, cylinder pressure, and engine performance. The indicated specific fuel consumption (ISFC) performance of the engine during the aluminum piston tests; the fuel rate, as measured with a mass flow meter; and power absorbed were determined and compared. The data showed a stable load, stable fuel flow and stable fuel-air-ratio (FAR). ISFC showed an initial increase (3.9%) followed by a clear decreasing trend. The same data on ISFC for the TBC piston test also showed an ISFC increase of 3.9% when fuel was switched from untreated to treated at 250 ppm ferrocene. This jump is followed by an apparent linear decrease until the engine shutdown at the end of day 5.

As noted above, FIG. 1 shows the variation of Indicated Means Effective Pressure (IMEP) and Indicated Specific Fuel Consumption (ISFC) with Time Shown as Fractional Changes from Mean Value of the Variable. The left hand side of the graph shows the ISFC data points (10) and IMEP data points (12) for the aluminum piston, and a trend line (14) is plotted for the ISFC data. The right hand graph shows ISFC data points (20) and IMEP data points (22) for the thermal barrier coated piston, and a trend line (24) is plotted for the ISFC data.

The test data showed that an immediate effect of switching to 250 ppm ferrocene was a 3.9% increase in ISFC. Both engine configurations responded similarly, indicating this increase in ISFC was homogeneous vapor phase combustion quench effect that is a direct result of the high dosage of ferrocene.

The data also showed a linear decrease in ISFC in the aluminum piston test during 60 to 310 minutes of operation. However, there was no significant ISFC effect in the 325 minutes ferrocene operation with the TBC piston, nor was such effect expected. The coating on the TBC piston was not applied to head and valve faces because previous testing had shown that active wall catalyst did not develop on bare metal combustion chamber surfaces. The TBC piston surface represents about 58% of the exposed combustion chamber surface at top dead center. Consequently, the net ISFC change expected is 0.045×0.58×250=6.53 or less than two standard errors less than 95% significance). On the other hand, averaging the two high-low data pairs observed in the 85 to 300 minute TBC test time period gives a 98% significance slope estimate. The decreasing ISFC trend slope estimates are: −0.0266 smoothed data versus −0.0269 raw data, which is 61% of the aluminum piston test slope during the active 250 ppm conditioning period of 85 to 370 minutes. Consequently, the thermal barrier coating applied only on the piston is shown to produce improvement proportionate to the 58% coated surface area in the combustion chamber at TDC. Thus, the ISFC trend appears to result from development of a wall catalyst derived from ferrocene combustion. In the aluminum piston engine, the coating developed in the presence of thermally insulating combustion deposits on the piston face, head and valve surfaces; while in the TBC piston engine, the coating developed only in the presence of thermal barrier coatings.

A similar ratio of improvements was observed in data from a Condensation Nuclei Counter (CNC) that measured the concentration of particles in the diesel exhaust. With the aluminum piston and full normal lube oil insulating base, a 47% reduction in particle numbers was observed. With the TBC piston, the engine produced a 31% reduction in particle numbers, which equates to 66% of the reduction found with the aluminum piston. This result is well within test measurement variability of ±13% of the 58% surface coverage of the TBC.

TABLE 2

Indicated Specific Fuel Consumption (ISFC) - Aluminum Piston

| Time in Minutes | Test Segment | Initial | Final | Slope | Significance |
| --- | --- | --- | --- | --- | --- |
| 0–50 | Baseline | 210 | 210 | None | — |
| 85–370 | Conditioning at 250 ppm | 215 | 203 | −0.043 | >99% |
| 340–605 | Over Conditioning at 250 ppm | 203 | 213 | +0.028 | >99% |
| 630–800 | Reconditioning at 25 ppm | 206 | 198 | −0.046 | >95% |

The particulate number concentration trends for the aluminum piston test showed a substantial increase in number of particles found with the addition of 250 ppm ferrocene. The increase of particles between 5.6 and 32 nm was by a factor of 86 for the high dosage of ferrocene and by a factor of 6.3 for the low dose ferrocene. Such tiny particles are believed to be formed by volatilization of metal compounds during the combustion stroke, followed by nucleation during expansion stroke. If the tiny particles are few in number, they can be absorbed onto soot, in which case few nuclei would be formed. Evidently, the ferrocene produced a large number of nuclei. Ferrocene is 30% iron by mass, corresponding to 7.5 and 75 ppm iron by mass in the fuel. Equilibrium calculations suggest the 250 ppm ferrocene dose should produce 10.3 mg of iron sulfate per standard $m^3$ in the exhaust. The detected tiny particles would account for only about 10% of the ferrocene iron. Thus, the remainder appears lost through other channels, including deposition on combustion chamber surfaces.

The number concentration of particulates decreased during engine conditioning. These changes are attributable to the subtle changes in heat release caused by continued operation at the high ferrocene dose. A 0.6 ratio of reduction in particle number concentration change was noted in the two tests during the high dose conditioning periods. This reduction ratio is similar to the 0.57 area coverage of the TBC and similar to the ISFC slope comparison. The formation of ultra fine particulates is extremely sensitive to combustion timing, so the substantial changes seen in both of these tests provide additional evidence that ferrocene engine conditioning does modify combustion characteristics.

A repeatability study of heat release rates measurements is presented in Table 3, showing measured peak pressure and calculated peak temperature with the crank angle at which each occurred for four separate baseline tests. The repeatability study suggests excellent repeatability of combustion pressure derived heat release results. Variation is sufficiently small that the range of 10% burn angle is only 6.4 to 6.6 CAD; 30% burn angle range is 8.1 to 8.3; 50% is 9.6 to 9.8; and 70% is 12.4 to 12.8.

TABLE 3

Baseline Repeatability of Pressure/Temperature Results

| Day of Test | Peak Pressure PSI | At CAD | IMEP | Peak Temperature ° R | At CAD |
|---|---|---|---|---|---|
| 5/31 | 1043 | 10.5 | 66.5 | 3862 | 15.5 |
| 5/31 | 1040 | 10.5 | 66.3 | 3851 | 15.5 |
| 6/1 | 1039 | 10.5 | 67.8 | 3844 | 15.5 |
| 6/1 | 1037 | 10.5 | 67.8 | 3845 | 15.5 |
| 6/1 | 1035 | 11.0 | 67.6 | 3844 | 17.5 |
| 6/2 | 1035 | 10.5 | 67.1 | 3838 | 17.5 |
| 6/2 | 1027 | 11.0 | 67.7 | 3838 | 15.5 |
| 6/4 | 1041 | 11.0 | 66.8 | 3864 | 15.5 |
| 6/4 | 1042 | 10.5 | 67.8 | 3823 | 15.5 |
| 6/4 | 1038 | 11.0 | 67.3 | 3840 | 15.5 |
| 6/4 | 1041 | 10.5 | 67.2 | 3835 | 15.5 |
| Average | 1038 | 10.7 | 67.3 | 3844 | 15.9 |
| Standard Deviation | 4.5 | 0.25 | 0.56 | 12 | 0.81 |

Table 3 Notes:
IMEP = Indicated Mean Effective Pressure

Table 4 shows the time sequence and peak temperature and pressure performance during the entire 175 minutes of operation of the aluminum piston test configuration on Day 2 (June 5) at a 250 ppm dose of ferrocene.

TABLE 4

Second Test Day (June 5) Pressure/Temperature Results
Aluminum Piston at 250 ppm Ferrocene Dose

| Cumulative Running Time (min) | Peak Pressure PSI | @ CAD | IMEP | Peak Temperature ° R | CAD | ISFC (kg/kWhr) |
|---|---|---|---|---|---|---|
| 460 | 1014 | 12.0 | 68.9 | 3871 | 16.5 | .162 |
| 485 | 1016 | 12.0 | 69.0 | 3881 | 16.5 | .162 |
| 500 | 1009 | 11.5 | 69.8 | 3834 | 16.5 | .165 |
| 515 | 1014 | 11.5 | 68.1 | 3811 | 16.5 | .164 |
| 530 | 1013 | 12.0 | 68.5 | 3858 | 16.5 | .163 |
| Avg. ± SSE | 1013 ± 2.6 | 11.8 ± 0.3 | 68.9 ± .6 | 3851 ± 28 | 16.5– | .163 ± .0013 |
| 545 | 1015 | 11.5 | 69.1 | 3822 | 15.5 | |
| 560 | 1013 | 11.5 | 68.6 | 3788 | 15.5 | |
| 575 | 1016 | 11.0 | 69.5 | 3765 | 15.5 | .161 |
| 590 | 1018 | 11.5 | 68.9 | 3795 | 15.5 | |
| 605 | 1016 | 11.5 | 68.7 | 3828 | 16.5 | |

The oxides of nitrogen show a 3% drop after an initial period of stability from 440 to 480 minutes with the minimum NOx occurring at 560 to 575 minutes followed by an increase. Exhaust temperature wanders for the first 85 minutes (440 through 525 minutes). The average exhaust temperature in this time frame is not significantly different from the Day 1 average. Between 515 and 560 minutes, however, the exhaust temperature drops significantly (855° F. versus 874° F. on Day 1) and then increases back up to 874° F. at 605 minutes. Inspection of the calculated peak temperature performance in this same time frame in Table 4 shows stable performance for the first five measurements. Subsequently, from 545 to 590 minutes there is a full degree timing change and a significant decrease in peak temperature with the minimum peak temperature corresponding to the minimum NOx point at 575 minutes.

Figure 2:
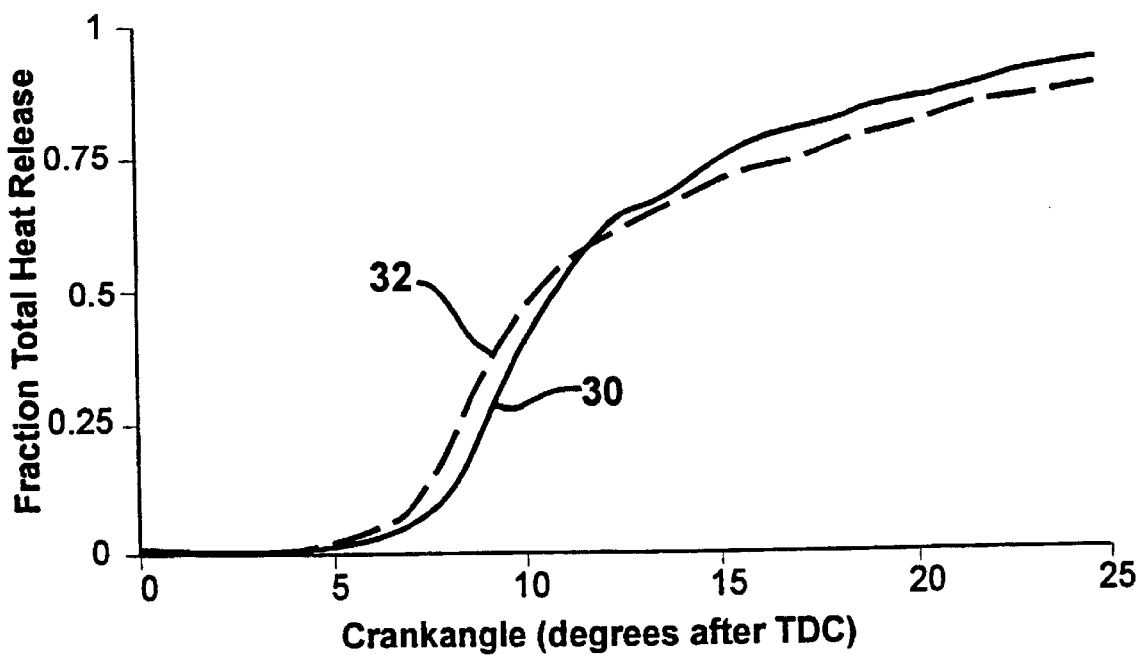
FIG. 2 is a data graph of cumulative heat release plotted against crank angle. This graph shows an increase in early heat release rate, which improves fuel economy, followed by a reduction in late stage heat release, which simultaneously reduces both particulate and NOx emissions.

FIG. 2 shows heat release plots corresponding to the runs of Table 4. Line 30 plots the beginning of NOx decrease at time 485 minutes. Line 30 is the pressure trace presented as the calculated total fractional heat release, versus crank angle degree, for the non-catalytic base case performance of the aluminum piston engine, at time 485 minutes into the test shown in FIG. 1. This heat release profile is taken during the time frame when the NOx emissions from the engine were stable at the base line level. Line 32 shows the same pressure trace measurement taken at 560 minutes, which is the time of minimum peak in-cylinder pressure and corresponds to the minimum NOx emissions from the engine. It should be observed that the ISFC shown in Table 4 for this series of data points with the active wall catalyst is lower than the base line ISFC for the data points nearest to the 485 minute profile plotted in FIG. 2. Consequently, FIG. 2 is a graphical confirmation of the novel and unique wall catalyst activity accelerating early phase heat release, from 5% to 60% total heat release, which improves power output and reduces fuel consumption while simultaneously reducing maximum in-cylinder temperature, as shown in Table 5, which is the determining factor for reducing NOx emissions.

This data shows no significant change for the first five data points. The next three data points (560, 575 and 590 minutes) show a substantial decrease in the crank angle at 30% burn completion (30% burn angle moves from 9.2±.08 average from 460 through 530 minutes to 8.5 CAD at 575 minutes) with no significant change in the 10% or 60% burn angle. FIG. 2 shows this shift in early heat release pattern without an apparent ignition timing change and presents the contrast between the heat release profiles at 485 minutes and 560 minutes as measured on day two. A developing flame front does not make significant contact with the combustion chamber walls until after 5 CAD after top dead center. Thus, wall catalytic effects do not change ignition characteristics, as is shown in the 3 to 6 CAD results in FIG. 2. The substantial acceleration of the heat release in the 30% to 40% combustion completion range in the 560 minute profile apparently allows this earlier pressure increase on the piston to be extracted more efficiently as work. This would be expected to improve ISFC. Plots for the data points of 590 and 605 show consistent movement back towards the 460 through 530 minute average profile. This again is consistent with the return of exhaust temperature to the higher average of Day 1. Consequently, it is believed that the wall catalytic activity reaches an observable maximum at 575 minutes.

Conclusions

The test program of Example 2 suggests that ferrocene fuel treatment results in the development of a catalytically active wall coating which may allow in-cylinder heat release rate shaping. The use of ferrocene additive influences the combustion process in a diesel engine, where the full effect of the additive takes several hours to develop.

Thus, both surface modification with a high thermal inertia coating (24 cc gasoline water pump and TBC diesel test results) and nanophase catalytic surface structure are necessary precursors to simple use of ferrocene for combustion efficiency and emissions improvement The performance of the additive is strongly dependent on the conditioning process.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. A method of catalytically improving the efficiency of fuel combustion in an internal combustion engine of low lube oil consumption design such as those built in compliance with U.S. clean air standards in effect after 1995, such that the engine has not developed sufficient combustion deposits on a combustion chamber surface to maintain a combustion catalyst nanophase surface thereon at a surface temperature effective for substantially improving efficiency of fuel combustion, comprising:

first, providing on a combustion facing engine surface a combustion-durable substrate layer of high thermal inertia and having a surface area of 300 to 500 square meters per gram as measured by BET nitrogen absorption, by a step selected from the group consisting of:
  supplying a substrate precursor in the combustion charge during engine operation by dissolving the substrate precursor in the fuel supply and feeding the substrate precursor into the combustion chamber with the fuel charge for deposition during the combustion of the fuel and discontinuing the supply of substrate precursor in the fuel supply after deposition of a substrate coating effective to support a nanophase catalyst surface,
  supplying a thermal barrier coating on the combustion facing engine surface prior to engine assembly, and combinations thereof,
simultaneously with or subsequently to said first step, providing in association with said substrate layer a nanophase catalyst surface of the type active in carbon particulate and fuel oxidation at a surface temperature of at least 450° C. and capable of providing a substantial improvement in efficiency of fuel combustion; and
subsequent to said step of providing a catalyst surface and substantially continuously during stable operation of the internal combustion engine, providing a catalyst precursor in the combustion charge, in a dosage sufficient to maintain tho nanophase catalyst surface, whereby catalytic activity and substantial improvement in efficiency of fuel combustion are substantially continuously maintained.

2. The method of catalytically improving the efficiency of fuel combustion in an internal combustion engine of claim 1, wherein the internal combustion engine is selected from the group consisting of a compression ignition engine and a spark ignition engine.

3. The method of catalytically improving the efficiency of fuel combustion in an internal combustion engine of claim 1 wherein the substrate layer is provided in a thickness in the approximate range from about 100 angstroms to about 100,000 angstroms.

4. The method of catalytically improving the efficiency of fuel combustion in an internal combustion engine of claim 1, wherein said step of providing a substrate layer comprises providing a substrate film of less than 0.1 mm thickness.

5. The method of catalytically improving the efficiency of fuel combustion in an internal combustion engine of claim 1 wherein said step of providing a substrate layer comprises providing a layer of thermal insulating compound effective to maintain the catalyst surface in a catalytically active temperature region of at least 450° C. during stable engine operation.

6. The method of catalytically improving the efficiency of fuel combustion in an internal combustion engine of claim 1, wherein said step of providing a substrate layer comprises providing a thermal insulating compound effective to maintain the catalyst surface at a temperature of at least 450° C. during stable engine operation.

7. The method of catalytically improving the efficiency of fuel combustion in an internal combustion engine of claim 1, wherein said step of providing a substrate layer comprises providing a substrate selected from the group consisting of zirconia, silica, lube oil ash, and combinations thereof.

8. The method of catalytically improving the efficiency of fuel combustion in an internal combustion engine of claim 1, wherein said step of providing a catalyst surface comprises providing a catalyst selected from the group consisting of nanophase iron, nanophase platinum, and combinations thereof.

9. The method of catalytically improving the efficiency of fuel combustion in an internal combustion engine of claim 1, wherein said step of providing a catalyst surface is conducted during operation of the engine by supplying a combustion charge containing ferrocene in an effective dosage to establish a catalytic iron coating.

10. The method of catalytically improving the efficiency of fuel combustion in an internal combustion engine of claim 1, wherein said step of providing a catalyst surface is conducted during operation of the engine by supplying a combustion charge containing ferrocene in a dosage range from 25 to 125 ppmw of engine fuel.

11. The method of catalytically improving the efficiency of fuel combustion in an internal combustion engine of claim 1, wherein said catalyst surface is provided simultaneously with said step of applying a substrate layer.

12. The method of catalytically improving the efficiency of fuel combustion in an internal combustion engine of claim 1, wherein the catalyst precursor is supplied in a dosage from about 5 to about 50 ppmw of an engine fuel in the combustion charge.

13. The method of catalytically improving the efficiency of fuel combustion in an internal combustion engine of claim 1, wherein said step of supplying a catalyst precursor comprises supplying ferrocene.

14. The method of catalytically improving the efficiency of fuel combustion in an internal combustion engine of claim 1, wherein said step of supplying a catalyst precursor comprises:
providing ferrocene in the combustion charge by the step selected from the group consisting of:
  adding ferrocene to a fuel supply feeding the combustion charge,
  adding ferrocene to a lube oil supply lubricating the engine,
  vaporizing ferrocene into an air intake stream feeding the combustion charge, and combinations thereof.

* * * * *